United States Patent
Tomas et al.

(10) Patent No.: US 10,871,144 B2
(45) Date of Patent: Dec. 22, 2020

(54) SYSTEM AND METHOD FOR REDUCING LOADS DURING AN IDLING OR PARKED STATE OF A WIND TURBINE VIA YAW OFFSET

(71) Applicant: General Electric Company, Schenectady, NY (US)

(72) Inventors: Santiago Tomas, Barcelona (ES); Jeffrey Alan Melius, Roanoke, VA (US); Ramy Michael Souri, Greer, SC (US); Jignesh Govindlal Gandhi, Simpsonville, SC (US); Edward Way Hardwicke, Jr., Simpsonville, SC (US); Darren John Danielsen, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/984,936

(22) Filed: May 21, 2018

(65) Prior Publication Data

US 2018/0347542 A1    Dec. 6, 2018

(30) Foreign Application Priority Data

May 30, 2017    (EP) .................................... 17382312

(51) Int. Cl.
*F03D 7/02*    (2006.01)
*F03D 17/00*    (2016.01)
(Continued)

(52) U.S. Cl.
CPC ......... *F03D 7/0212* (2013.01); *F03D 7/0268* (2013.01); *F03D 7/047* (2013.01);
(Continued)

(58) Field of Classification Search
CPC ........ F03D 7/0212; F03D 17/00; F03D 80/80; F03D 7/0268; F03D 7/047; F03D 7/0224
See application file for complete search history.

(56) References Cited

U.S. PATENT DOCUMENTS

| | | | |
|---|---|---|---|
| 8,025,476 B2 * | 9/2011 | Zheng | F03D 7/0224 415/1 |
| 2009/0081041 A1 * | 3/2009 | Frese | F03D 7/0212 416/1 |

(Continued)

FOREIGN PATENT DOCUMENTS

EP    1 990 539 A1    11/2008

OTHER PUBLICATIONS

Extended European Search Report and Opinion issued in connection with corresponding EP Application No. 17382312.1 dated Nov. 15, 2017.

*Primary Examiner* — Tulsidas C Patel
*Assistant Examiner* — Joseph Ortega
(74) *Attorney, Agent, or Firm* — Dority & Manning, P.A.

(57) ABSTRACT

The present disclosure is directed to a method for reducing loads of a wind turbine. The method includes monitoring, via a turbine controller, a rotor blade of the wind turbine for faults. If a fault is detected, the method includes determining an operational status of the wind turbine. If a predetermined operational status is present at the same time the fault is present, the method also include actively yawing a nacelle of the wind turbine away from an incoming wind direction until either the fault is corrected or cleared and/or the operational status changes.

14 Claims, 5 Drawing Sheets

(51) Int. Cl.
*F03D 7/04* (2006.01)
*F03D 80/80* (2016.01)
(52) U.S. Cl.
CPC ............. *F03D 17/00* (2016.05); *F03D 80/80* (2016.05); *F03D 7/0224* (2013.01)

(56) References Cited

U.S. PATENT DOCUMENTS

| | | | |
|---|---|---|---|
| 2011/0211951 A1* | 9/2011 | Kooijman | F03D 7/0224 416/1 |
| 2012/0286519 A1* | 11/2012 | Yoon | F03D 7/0204 290/55 |
| 2015/0086357 A1* | 3/2015 | Gregg | F03D 7/046 416/1 |
| 2017/0138348 A1* | 5/2017 | Bonding | F03D 7/0224 |
| 2019/0048849 A1* | 2/2019 | Grunnet | F03D 7/042 |
| 2019/0107100 A1* | 4/2019 | Brorsen | F03D 7/0204 |
| 2019/0153999 A1* | 5/2019 | Nielsen | F03D 7/0204 |

\* cited by examiner

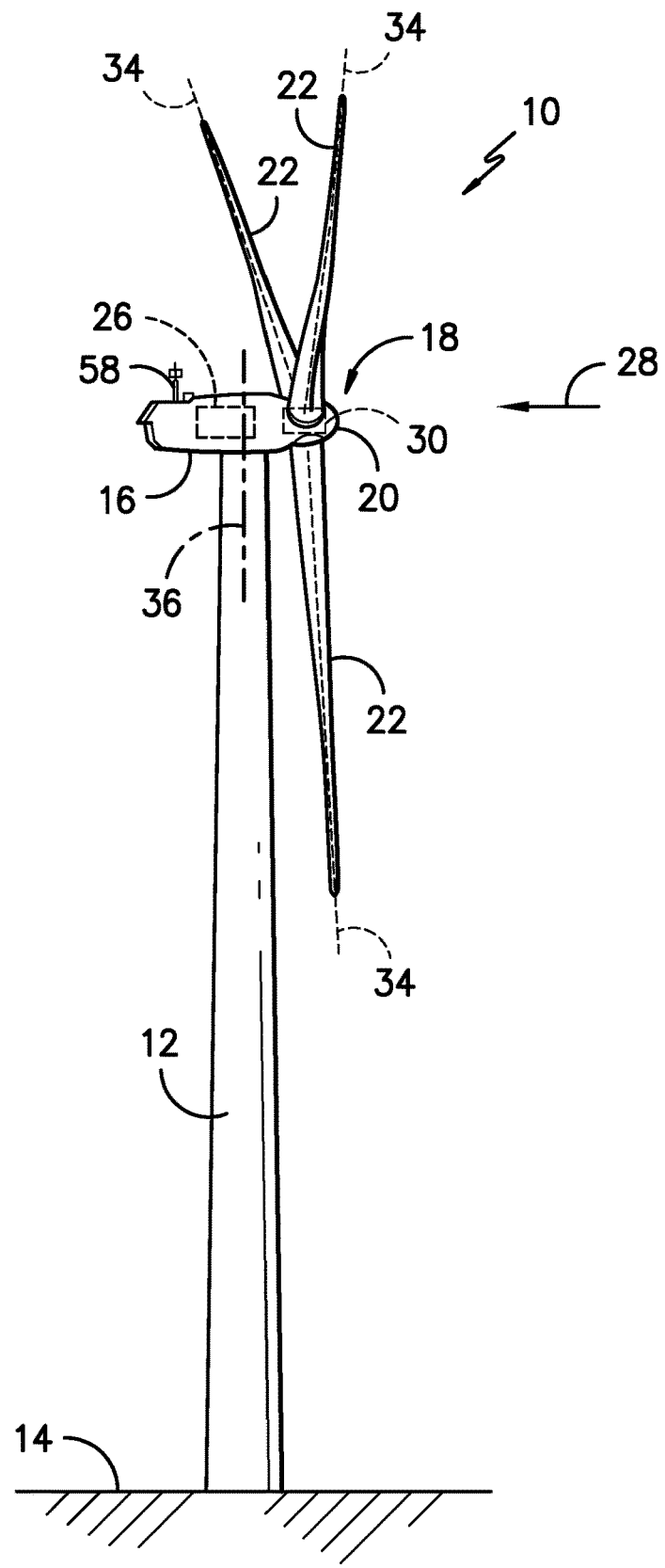
FIG. -1-

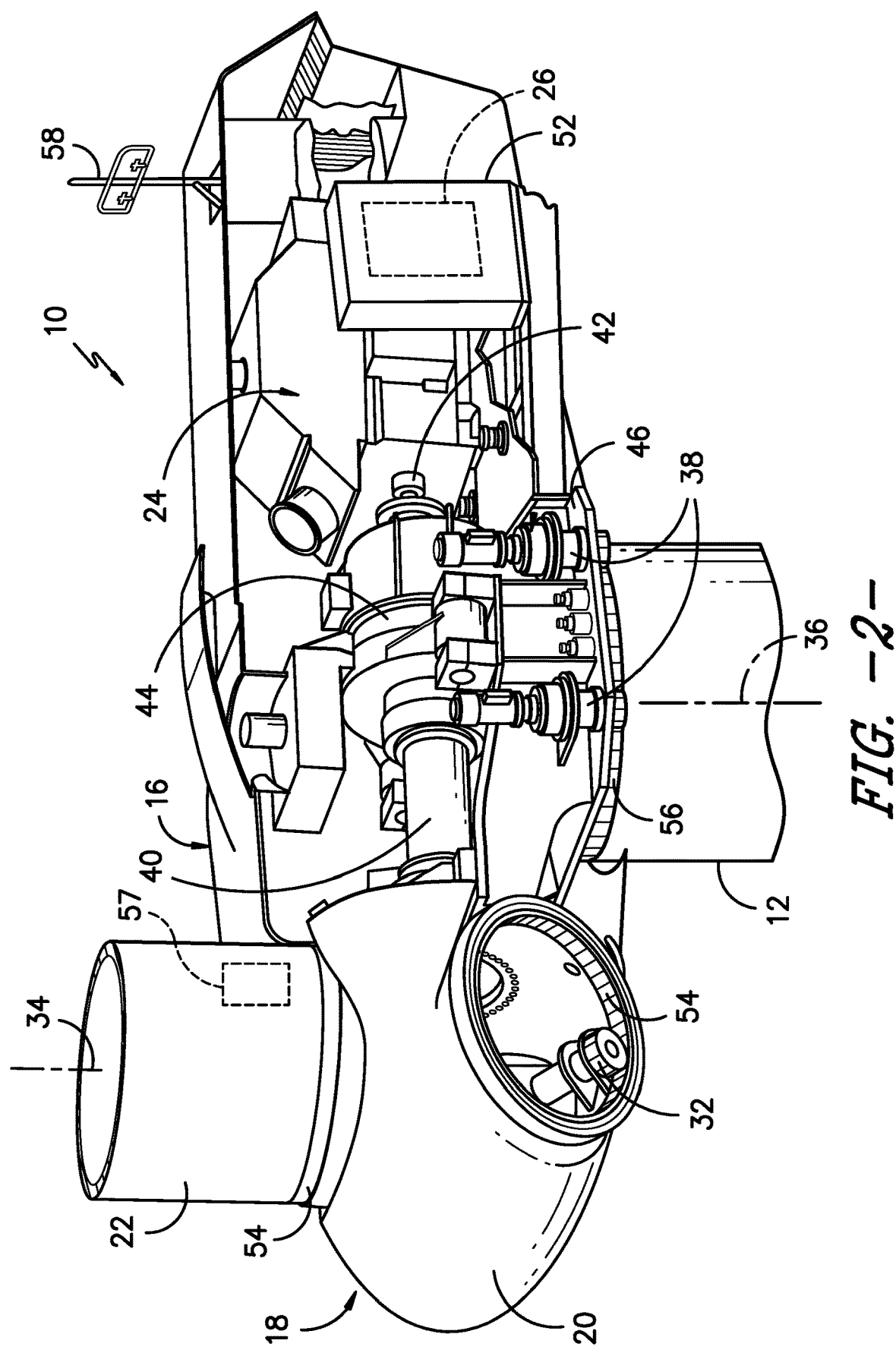
FIG. -2-

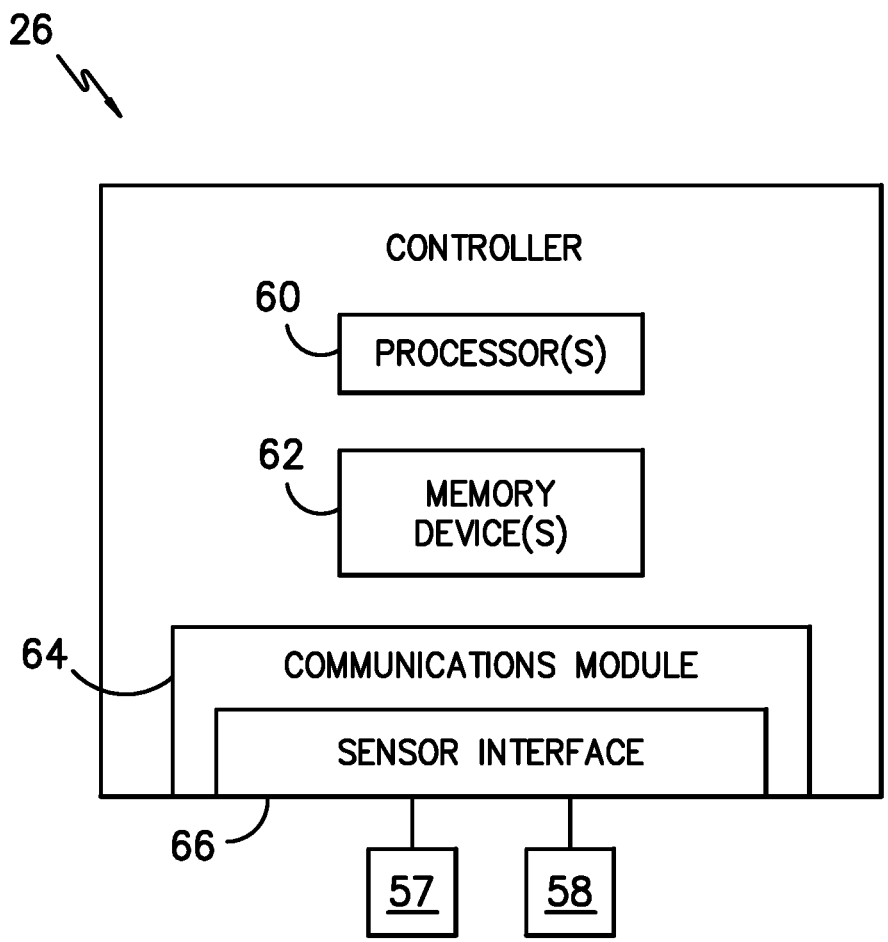
FIG. -3-

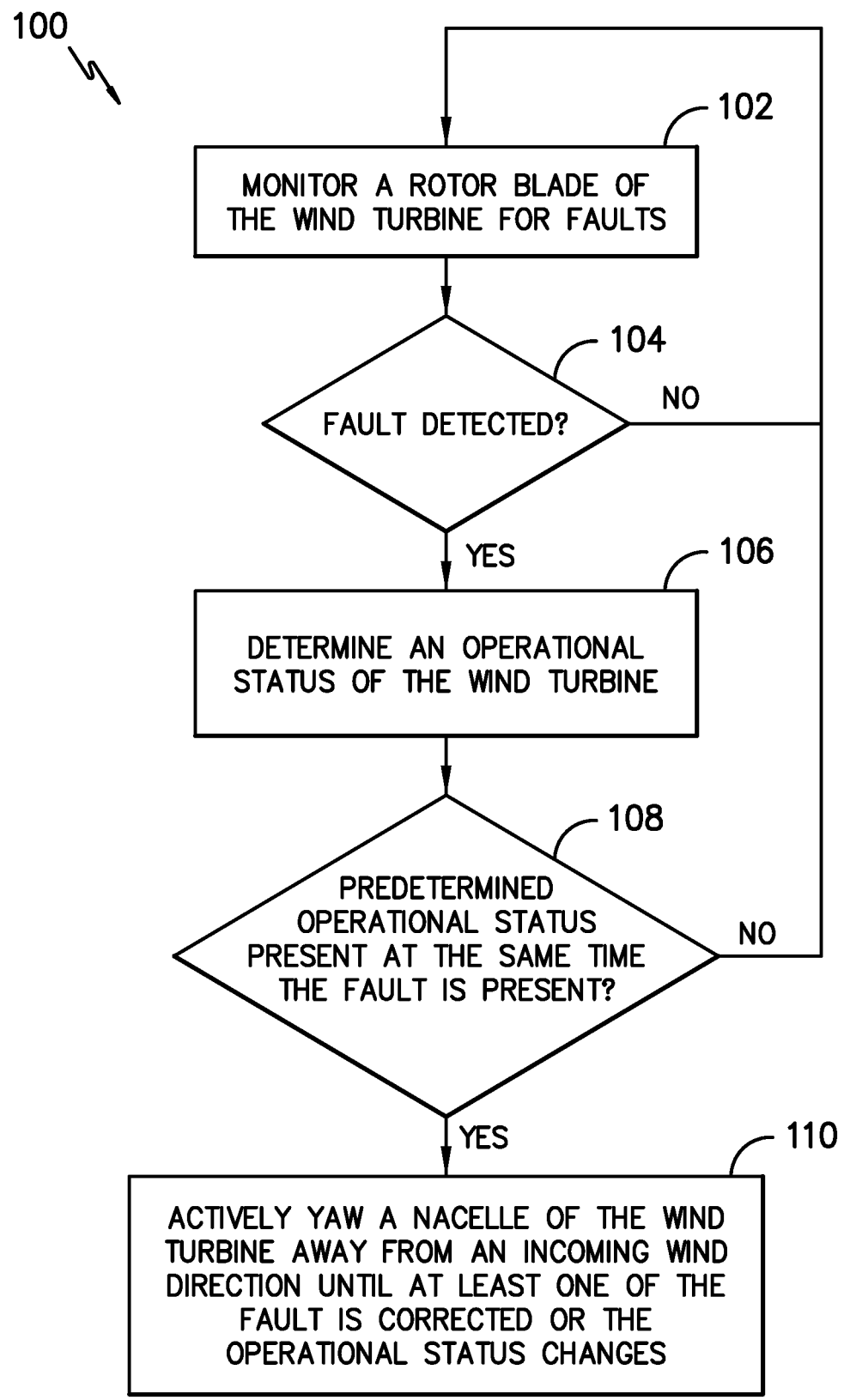
FIG. -4-

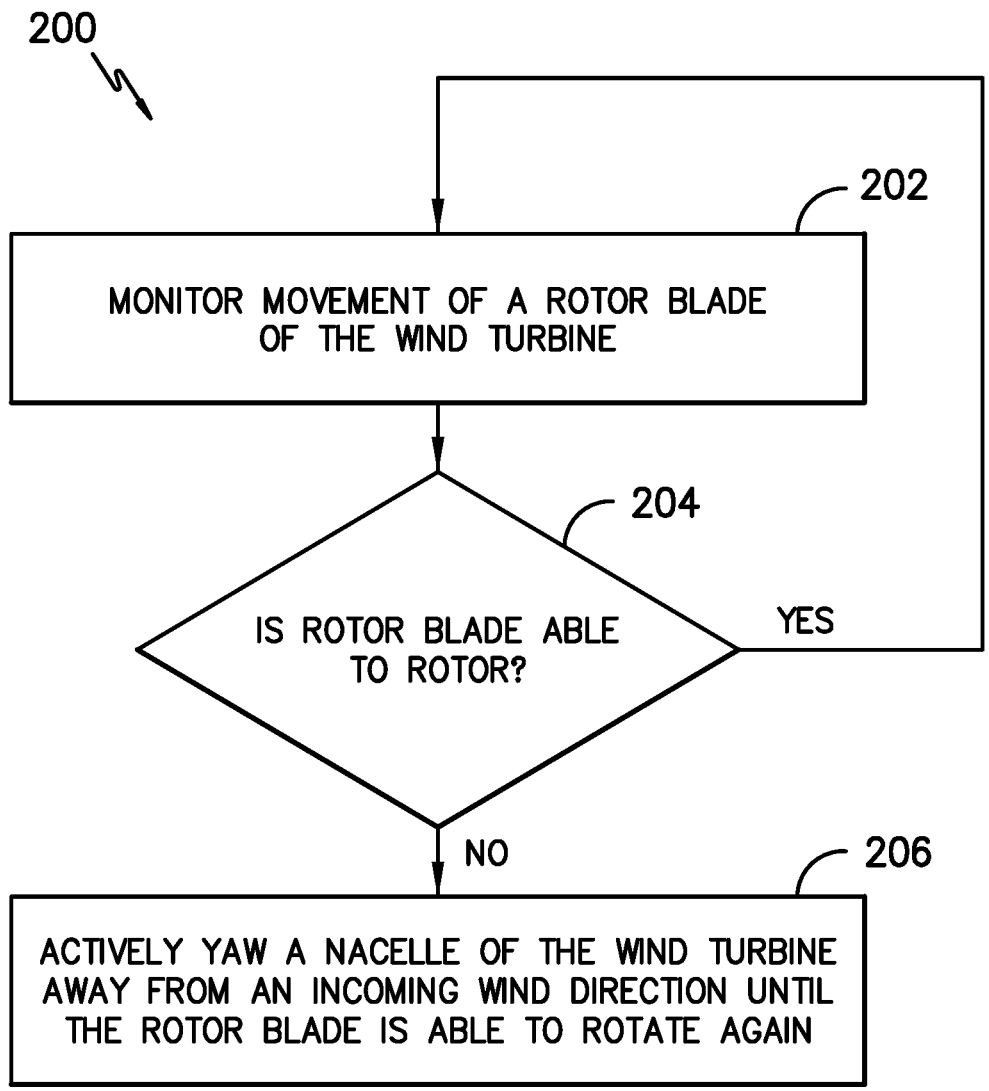
FIG. -5-

SYSTEM AND METHOD FOR REDUCING LOADS DURING AN IDLING OR PARKED STATE OF A WIND TURBINE VIA YAW OFFSET

FIELD OF THE INVENTION

The present disclosure relates generally to wind turbines, and more particularly to systems and methods for reducing loads during an idling or parked state of a wind turbine via yaw offset.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, when the wind turbine is parked or idling, conventional control strategies include actively tracking the wind direction to provide better alignment to the wind direction so as to minimize start-up delays when the wind speed increases or decreases back into the operating range.

However, in a situation where the wind turbine is faulted and one of the rotor blades remains stuck (unlike the normal idling situation), there are limited benefits to tracking the wind as repair will is needed before restarting the wind turbine. In addition, in such situations, the wind turbine experiences increased loads due to the stuck rotor blade as well as rotor imbalance.

Accordingly, improved systems and methods for reducing loads during an idling or parked state of a wind turbine would be desired. In particular, the present disclosure is directed to systems and methods which actively yaw the nacelle of the wind turbine out of the wind when the wind turbine is idling or parked and one of the rotor blades is stuck so as to reduce loads during this scenario.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for reducing loads of a wind turbine. The method includes monitoring, via a turbine controller, a rotor blade of the wind turbine for faults. If a fault is detected, the method includes determining an operational status of the wind turbine. If a predetermined operational status is present at the same time the fault is present, the method also include actively yawing a nacelle of the wind turbine away from an incoming wind direction until at least one of the fault is corrected or the operational status changes.

In one embodiment, the faults may include a pitch bearing fault, a pitch drive mechanism fault, an electrical fault, or any other fault, error, or defect e.g. that prevents the rotor blade from operating normally.

In another embodiment, the method may include determining a predetermined yaw offset for yawing the nacelle. For example, in certain embodiments, the predetermined yaw offset may include a fixed value. More specifically, in particular embodiments, the predetermined yaw offset may be about ninety degrees (90°), plus or minus from about one degree (1°) to about thirty degrees (60°) from the starting 90° reference point.

In alternative embodiments, the predetermined yaw offset may vary as a function of a pitch angle of the rotor blade, wind speed, density, rotor imbalance, and/or vibration of the wind turbine. In several embodiments, the method may include maintaining the predetermined yaw offset for as long as the fault and the predetermined operational status remain present.

In additional embodiments, the predetermined operational status of the wind turbine may include an idling state or a parked state. Thus, in such embodiments, the method may include continuously monitoring the incoming wind direction during the idling state and yawing the nacelle into the incoming wind direction if no fault is detected. For example, in certain embodiments, the method may include continuously monitoring the incoming wind direction to enable/disable the control scheme. In other words, for low wind speeds, the method may not apply any offset to the yawing algorithm, but rather may continue to track the incoming wind. Alternatively, for high wind speeds, i.e. above a threshold, the method may include enabling the control scheme and actively yawing the nacelle out of the incoming wind direction.

In yet another embodiment, the method may also include pitching remaining rotor blades of the wind turbine if the fault is detected in the rotor blade.

In another aspect, the present disclosure is directed to a system for reducing loads of a wind turbine during a rotor blade fault. The system includes at least one sensor configured for monitoring a rotor blade of the wind turbine and a controller communicatively coupled to sensor(s). The controller includes at least one processor configured to perform one or more operations, including but not limited to determining an operational status of the wind turbine if a rotor blade fault is detected via the sensor(s) and if a predetermined operational status is present at the same time the fault is present, actively yawing a nacelle of the wind turbine away from an incoming wind direction until either the fault is corrected or the operational status changes. It should be understood that the system may further include any of the additional features and/or steps as described herein.

In yet another aspect, the present disclosure is directed to a method for reducing loads during an idling state of a wind turbine. The method includes monitoring, via a turbine controller, movement of a rotor blade of the wind turbine. If the rotor blade becomes unable to rotate, the method includes actively yawing a nacelle of the wind turbine away from an incoming wind direction until the rotor blade is able to rotate again.

In one embodiment, the rotor blade may become unable to rotate due to a pitch bearing fault, a pitch drive mechanism fault, an electrical fault, and/or a maintenance issue. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 illustrates a perspective, internal view of a nacelle of a wind turbine according to one embodiment of the present disclosure;

FIG. 3 illustrates a schematic diagram of one embodiment of suitable components that may be included in a wind turbine controller according to the present disclosure;

FIG. 4 illustrates a flow diagram of one embodiment of a method for reducing loads of a wind turbine according to the present disclosure; and FIG. 5 illustrates a flow diagram of one embodiment of a method for reducing loads during an idling state of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

In addition, as shown in FIG. 2, one or more sensors 57, 58 may be provided on the wind turbine 10. More specifically, as shown, a blade sensor 57 may be configured with one or more of the rotor blades 22 to monitor the rotor blades 22, e.g. for faults and/or loads, which is described in more detail herein. In addition to being a physical sensor mounted to the one or more of the rotor blades 22, the faults may be monitored via a limit switch, as well as non-physical parameters such as an acceleration, a status message from the controller communication loss, an encoder failure, a blade position angle, an actual versus commanded pitch angle, or similar. It should also be appreciated that, as used herein, the term "monitor" and variations thereof indicates that the various sensors of the wind turbine 10 may be configured to provide a direct measurement of the parameters being monitored or an indirect measurement of such parameters. Thus, the sensors described herein may, for example, be used to generate signals relating to the parameter being monitored, which can then be utilized by the controller 26 to determine the condition.

Further, as shown, a wind sensor 58 may be provided on the wind turbine 10. The wind sensor 58, which may for example be a wind vane, and anemometer, and LIDAR sensor, or another suitable sensor, may measure wind speed and direction. As such, the sensors 57, 58 may further be in communication with the controller 26, and may provide related information to the controller 26. For example, yawing of the wind turbine 10 may occur due to sensing of changes in the wind direction 28, in order to maintain alignment of the wind turbine 10 with the wind direction 28. In addition, yawing of the wind turbine 10 may occur due to sensing a rotor blade fault, which is described in more detail herein.

Further, the turbine controller 26 may also be communicatively coupled to various components of the wind turbine 10 for generally controlling the wind turbine 10 and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the direction 28 of the wind changes, the turbine controller 26 may be configured to control a yaw angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Similarly, the turbine controller 26 may also be communicatively coupled to each pitch adjustment mechanism 32 of the wind turbine 10 (one of which is shown) through the pitch controller 30 for controlling and/or altering the pitch angle of the rotor blades 22 (i.e., an angle that determines a perspective of the rotor blades 22 with respect to the direction 28 of the wind). For instance, the turbine controller 26 and/or the pitch controller 30 may be configured to transmit a control signal/command to each pitch adjustment mechanism 32 such that one or more actuators (not shown) of the pitch adjustment mechanism 32 may be utilized to adjust the pitch angle of the rotor blades 22 by rotating the blades 22 along their pitch axes 34 via a pitch bearing 54. The turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 (FIG. 2) of the wind turbine, or by directly controlling the operation of the plurality of pitch drives or pitch adjustment mechanisms.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

As discussed above, a wind turbine 10, such as the nacelle 16 thereof, may rotate about the yaw axis 36 as required. In particular, rotation about the yaw axis 36 may occur due to changes in the wind direction 28, such that the rotor 18 is aligned with the wind direction 28. For example, when the wind turbine 10 is in an idling state, the controller 26 actively tracks the wind direction to provide better alignment to the wind and minimize start-up delays when the wind speed increases or decreases back into the operating range. However, in a situation where the wind turbine 10 is faulted and one or more of the rotor blades 22 is prevented from rotating (unlike the normal idling situation), there are limited benefits to tracking the wind because repair will be required before restarting the wind turbine 10. Thus, in such situations, the turbine controller 26 is configured to implement a control strategy to reduce the drag force on the faulted rotor blade so as to reduce loads thereon and/or to prevent rotor imbalance.

More specifically, as shown in FIG. 4, a flow diagram of one embodiment of a method 100 for reducing loads of the wind turbine 10 is illustrated. As shown at 102, the method 100 includes monitoring one or more of the rotor blades 22 of the wind turbine 10 for faults, e.g. via the turbine controller 26. In one embodiment, the faults described herein may include a pitch bearing fault, a pitch drive mechanism fault, an electrical fault, and/or any other fault, error, or defect e.g. that prevents one of the rotor blades 22 from operating normally. In addition, the faults described herein may also be caused by maintenance being performed on one or more of the rotor blades 22.

In certain embodiments, the rotor blades 22 may be monitored via one or more sensors, e.g. via sensor 57. As shown at 104, the controller 26 is configured to determine whether a fault is detected. If a fault is detected, as shown at 106, the controller 26 is configured to determine an operational status of the wind turbine 10. As shown at 108, the controller 26 is also configured to determine if a predetermined operational status is present at the same time the fault is present. More specifically, the predetermined operational status of the wind turbine 10 may include an idling state or a parked state of the wind turbine 10. As used herein, the "idling state" of the wind turbine 10 generally refers to the operational state where, due to lack of wind or some other operational conditions (e.g. faults), the rotatable hub 20 of the wind turbine 10 is allowed to rotate (i.e. idle) at low rotational speeds, e.g. around 0.2 rpm, rather than being stopped completely. In contrast, a "parked state" of the wind turbine 10 generally refers to the operational state where the rotatable hub 20 is stopped and prevented from rotating.

If one of the predetermined operational statuses mentioned above are present at the time of the rotor blade fault, as shown at 110, the controller 26 actively yaws the nacelle 16 of the wind turbine 10 away from an incoming wind direction (as represented by arrow 28 of FIG. 1) until either the fault is corrected or the operational status changes. Accordingly, actively yawing out of the wind in these situations provides substantial loads reduction.

In yet another embodiment, the controller 26 may also be configured to actively pitch the remaining rotor blades 22 of the wind turbine 10 (i.e. the rotor blades 22 unaffected by the fault) so as to reduce loads. It should be understood that such pitching may be implemented by the controller 26 in combination with yawing the nacelle 16 out of the wind or as a separate loads reduction action.

In addition, in several embodiments, the controller 26 is configured to determine a predetermined yaw offset for yawing the nacelle 16. For example, in certain embodiments, the predetermined yaw offset may include a fixed value. In such embodiments, the predetermined yaw offset may be about ninety degrees (90°), plus or minus from about one degree (1°) to about thirty degrees (60°) from the starting 90° reference point. In alternative embodiments, the predetermined yaw offset may vary as a function of the faulted pitch angle of the rotor blade 22 and/or the wind turbine type. In additional embodiments, the predetermined yaw offset may vary as a function of wind speed, density, rotor imbalance, and/or vibrations of the wind turbine 10, e.g. as detected by one or more vibration sensors. As such, the method 100 may include maintaining the predetermined yaw offset for as long as the rotor blade fault and the predetermined operational status remain present.

It should also be understood that if no fault is detected, the controller 26 is configured to continuously monitor the incoming wind direction, e.g. during the idling state, and yaw the nacelle 16 into the incoming wind direction to provide improved alignment to the wind with minimal start-up delays when the wind speed increases or decreases back into the operating range.

Referring now to FIG. 5, a flow diagram of one embodiment of a method 200 for reducing loads of the wind turbine 10 during an idling state where one or more of the rotor blades 22 is also prevented from rotating is illustrated. As shown at 202, the method 100 includes monitoring movement of the rotor blade 22 of the wind turbine 10 via the controller 26. As shown at 204, the controller 26 determines whether the rotor blade 22 is able to rotate. For example, in one embodiment, the rotor blade 22 may become unable to rotate due to a pitch bearing fault, a pitch drive mechanism fault, an electrical fault, and/or a maintenance issue. As shown at 206, if the rotor blade 22 becomes unable to rotate, the controller 26 actively yaws the nacelle 16 of the wind turbine 10 away from the incoming wind 28 until the rotor blade 22 is able to rotate again, i.e. the fault is cleared or repaired and/or the maintenance issue is addressed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing loads of a wind turbine, the method comprising:
   monitoring, via a turbine controller, a pitch system of the rotor blade of the wind turbine for faults;
   if a fault is detected, determining an operational status of the wind turbine;
   determining a yaw offset for yawing the nacelle, the yaw offset comprising about ninety degrees (90°) plus or minus from about one degree (1°) to about thirty degrees (30°); and,
   if the operational status corresponds to a predetermined operational status at the same time the fault is present, actively yawing a nacelle of the wind turbine away from an incoming wind direction by the yaw offset until at least one of the fault is corrected or the operational status changes.

2. The method of claim 1, wherein the faults comprise at least one of a pitch bearing fault, a pitch drive mechanism fault, or an electrical fault.

3. The method of claim 1, wherein the yaw offset varies as a function of at least one of a pitch angle of the rotor blade, wind speed, density, rotor imbalance, or vibration of the wind turbine.

4. The method of claim 1, further comprising maintaining the yaw offset for as long as the fault and the predetermined operational status remain present.

5. The method of claim 1, wherein the predetermined operational status of the wind turbine comprises at least one of an idling state or a parked state.

6. The method of claim 5, further comprising continuously monitoring the incoming wind direction during the idling state and yawing the nacelle into the incoming wind direction if no fault is detected.

7. The method of claim 1, further comprising pitching remaining rotor blades of the wind turbine if the fault is detected in the rotor blade.

8. A system for reducing loads of a wind turbine during a rotor blade fault, the system comprising:
   at least one sensor configured for monitoring a rotor blade of the wind turbine;
   a controller communicatively coupled to the at least one sensor, the controller comprising at least one processor configured to perform one or more operations, the one or more operations comprising:
   determining an operational status of the wind turbine if a rotor blade fault is detected via the at least sensor; and,
   determining a yaw offset for yawing the nacelle, the yaw offset comprising about ninety degrees (90°) plus or minus from about one degree (1°) to about thirty degrees (30°);
   if the operational status corresponds to a predetermined operational status at the same time the fault is present, actively yawing a nacelle of the wind turbine away from an incoming wind direction by the yaw offset until at least one of the fault is corrected or the operational status changes.

9. The system of claim 8, wherein the rotor blade fault comprises at least one of a pitch bearing fault, a pitch drive mechanism fault, or an electrical fault.

10. A method for reducing loads during an idling state of a wind turbine, the method comprising:
    monitoring, via a turbine controller, rotation of a rotor blade of the wind turbine during the idling state;
    determining a yaw offset for yawing a nacelle of the wind turbine, the yaw offset comprising about ninety degrees (90°) plus or minus from about one degree (1°) to about thirty degrees (30°); and,
    when the rotor blade becomes unable to rotate, actively yawing the nacelle of the wind turbine away from an incoming wind direction by the yaw offset until the rotor blade is able to rotate again and the wind turbine is no longer idling.

11. The method of claim 10, wherein the rotor blade becomes unable to rotate due to at least one of a pitch bearing fault, a pitch drive mechanism fault, an electrical fault, or a maintenance issue.

12. The method of claim 10, wherein the yaw offset varies as a function of a pitch angle of the rotor blade.

13. The method of claim 10, further comprising maintaining the yaw offset for as long as the rotor blade remains unable to rotate.

14. The method of claim 10, further comprising continuously monitoring the incoming wind direction during the idling state and yawing the nacelle into the incoming wind direction as long as the rotor blade is able to rotate.

* * * * *